US009569538B1

(12) United States Patent
Clark et al.

(10) Patent No.: US 9,569,538 B1
(45) Date of Patent: Feb. 14, 2017

(54) GENERATING CONTENT BASED ON A WORK OF AUTHORSHIP

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/957,640

(22) Filed: Dec. 3, 2015

(51) Int. Cl.
*G06F 17/30* (2006.01)
*G06F 7/00* (2006.01)
*H04L 12/58* (2006.01)

(52) U.S. Cl.
CPC ..... *G06F 17/30864* (2013.01); *G06F 17/3089* (2013.01); *G06F 17/30654* (2013.01); *G06F 17/30684* (2013.01); *H04L 51/16* (2013.01)

(58) Field of Classification Search
CPC ............... G06F 17/30554; G06F 17/30867; G06F 17/30864; G06F 17/30528; G06F 17/04842; G06F 17/30424; G06F 17/30991; G06F 3/04842
See application file for complete search history.

(56) References Cited

U.S. PATENT DOCUMENTS

| | | | |
|---|---|---|---|
| 5,708,825 A | 1/1998 | Sotomayor | |
| 9,087,129 B2 * | 7/2015 | Messina | G06F 17/30864 |
| 2004/0024747 A1 | 2/2004 | Boguraev et al. | |
| 2006/0053135 A1 | 3/2006 | Beaumont et al. | |
| 2012/0297278 A1 | 11/2012 | Gattani et al. | |
| 2013/0007020 A1 | 1/2013 | Basu et al. | |
| 2013/0073336 A1 * | 3/2013 | Heath | G06Q 30/02 705/7.29 |
| 2013/0073388 A1 * | 3/2013 | Heath | G06Q 50/01 705/14.53 |
| 2014/0089777 A1 | 3/2014 | Roiniotis et al. | |
| 2014/0143241 A1 * | 5/2014 | Barello | G06F 17/3089 707/724 |
| 2014/0282030 A1 | 9/2014 | Bhatnagar et al. | |

OTHER PUBLICATIONS

Romero et al., "Using Wikipedia concepts and frequency in language to extract key terms from support documents," Expert Systems with Applications 39 (2012), pp. 13480-13491, Copyright 2012 Elsevier Ltd. All rights reserved.

* cited by examiner

*Primary Examiner* — Dung K Chau

(74) *Attorney, Agent, or Firm* — Robert J. Shatto

(57) ABSTRACT

Content of a work of authorship can be ingested using natural language processing (NLP). Content displayed on an Internet forum can be ingested using NLP. A relationship between the content of the work of authorship and the content displayed on the Internet forum can be identified based on the ingested content of the work of authorship and the ingested content displayed on the Internet forum. Information associated with the work of authorship can be caused, based on the identified relationship, to be displayed on the Internet forum such that the information is visually-associated with the displayed content.

21 Claims, 10 Drawing Sheets

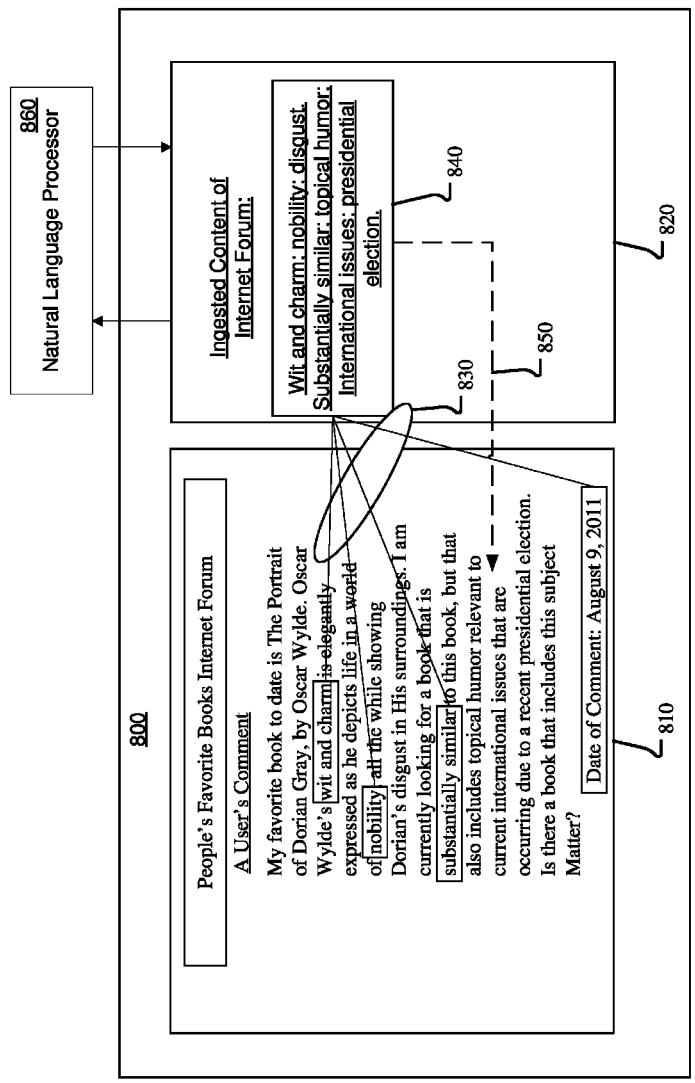

900

People's Favorite Books Internet Forum

A User's Comment

My favorite book to date is The Portrait of Dorian Gray, by Oscar Wylde. Oscar Wylde's wit and charm is elegantly expressed as he depicts life in a world of nobility; all the while showing Dorian's disgust in His surroundings. I am currently looking for a book that is substantially similar to this book, but that also includes topical humor relevant to current international issues that are occurring due to a recent presidential election. Is there a book that includes this subject Matter?

Date of Comment: August 9, 2011

Sub comment to User's Comment

President's Election by Author Writer

... a fascinating insight into Michael Seymour's presidential campaign... wit and charm resembles that of Oscar Wylde ... distaste with nobility, and suggestions for solving international issues is entertaining.

Date of Comment: August 10, 2011

GENERATING CONTENT BASED ON A WORK OF AUTHORSHIP

BACKGROUND

The present disclosure relates generally to the field of natural language processing, and, more particularly, to using natural language processing in generating content to be displayed on Internet forums or other electronic communications.

As a field of computer science, natural language processing tends to focus on the interactions between computer systems and human languages. Many modern natural language processing algorithms are derived based on machine learning and rely heavily on statistical inferences. By analyzing a large set of real-world examples of natural language usage, a computer system may be able to glean sets of rules that guide the machine through future analysis of natural language passages.

SUMMARY

Embodiments of the disclosure provide a computer-implemented method, system, and computer program product. The method, system, and computer program product can ingest content of a work of authorship using natural language processing (NLP). The method, system, and computer program product can further ingest content displayed on an Internet forum using NLP. The method, system, and computer program product can further identify a relationship between the work of authorship and the displayed content based on the ingested content of the work of authorship and the ingested content displayed on the Internet forum. The method, system, and computer program product can further cause, based on the identified relationship, information associated with the work of authorship to be displayed on the Internet forum such that the information is visually-associated with the displayed content.

Embodiments of the disclosure further provide a computer-implemented method. The method can ingest content of a work of authorship using natural language processing (NLP). The method can further ingest content displayed within an electronic communication using NLP. The method can further identify a relationship between the work of authorship and the displayed content based on the ingested content of the work of authorship and the ingested content displayed within the electronic communication. The method can further cause, based on the identified relationship, information associated with the work of authorship to be displayed within the electronic communication such that the information is visually-associated with the displayed content.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8 illustrates an example use of methods disclosed herein to ingest example content displayed on an Internet forum, in accordance with embodiments of the present disclosure.

FIG. 9 illustrates an example use of methods disclosed herein to generate and post information associated with a work of authorship to the Internet forum described in FIG. 8, in accordance with embodiments of the present disclosure.

Figure 1:
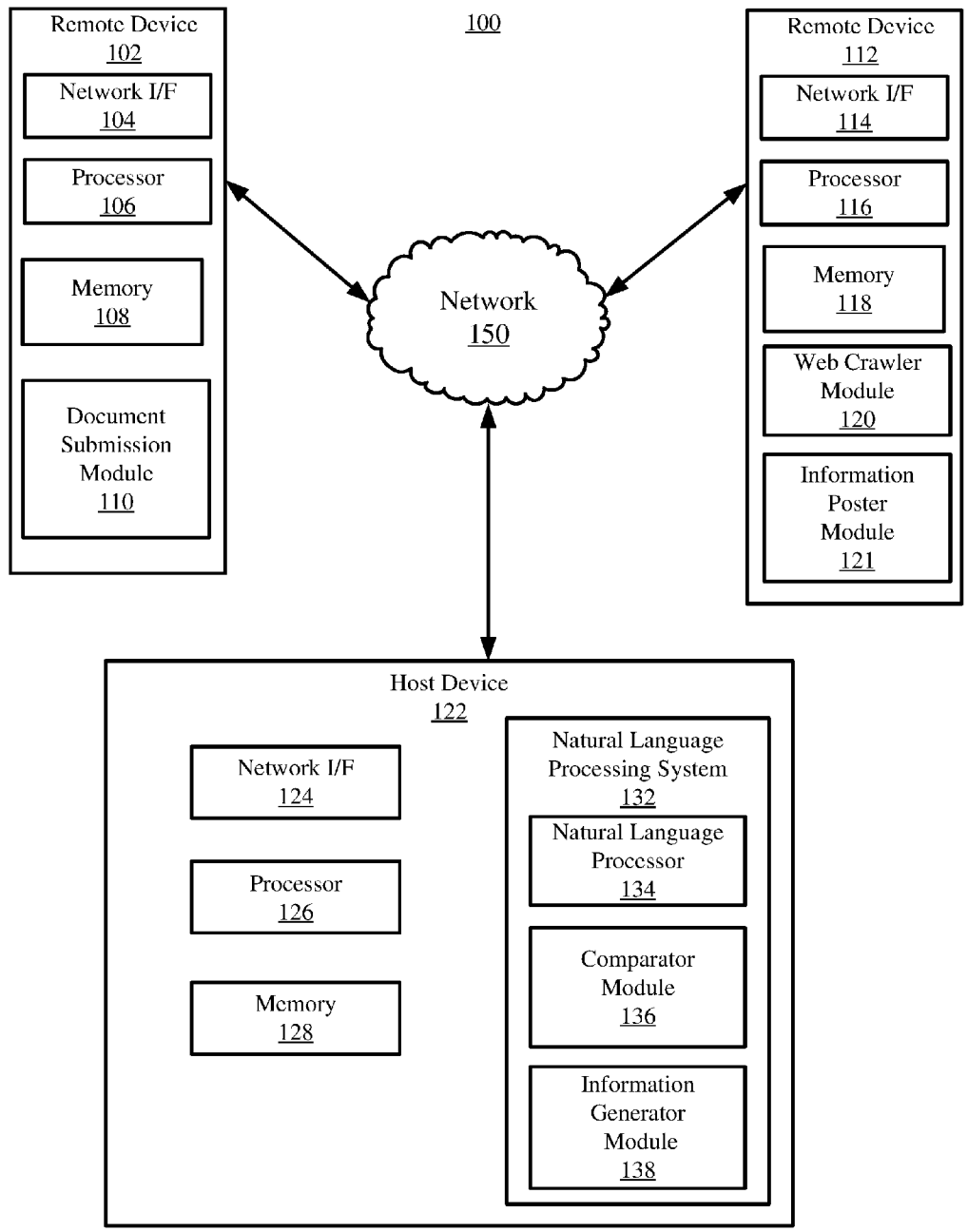
FIG. 1 illustrates a block diagram of an example computing environment in which illustrative embodiments of the present disclosure may be implemented.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to the field of natural language processing, and, more particularly, to using natural language processing in generating content to be displayed on Internet forums or other electronic communications. While the present disclosure is not necessarily limited to such applications, various aspects of the disclosure may be appreciated through a discussion of various examples using this context.

As discussed above, aspects of the disclosure may relate to natural language processing. Accordingly, an understanding of the embodiments of the present disclosure may be aided by describing embodiments of natural language processing systems and the environments in which these systems may operate. Turning now to the figures, FIG. 1 illustrates a block diagram of an example computing environment 100 in which illustrative embodiments of the present disclosure may be implemented. In some embodiments, the computing environment 100 may include two remote devices 102 and 112 and a host device 122.

Consistent with various embodiments, the host device 122 and the remote devices 102 and 112 may be computer systems. The remote devices 102 and 112 and the host device 122 may include one or more processors 106, 116, and 126 and one or more memories 108, 118, and 128, respectively. The remote devices 102 and 112 and the host device 122 may be configured to communicate with each other through an internal or external network interface 104, 114, and 124. The network interfaces 104, 114, and 124 may be, e.g., modems or network interface cards. The remote devices 102 and 112 and/or the host device 122 may be equipped with a display or monitor. Additionally, the remote devices 102 and 112 and/or the host device 122 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote devices 102 and 112 and/or the host device 122 may be servers, desktops, laptops, or hand-held devices.

The remote devices 102 and 112 and the host device 122 may be distant from each other and communicate over a network 150. In some embodiments, the host device 122 may be a central hub from which remote devices 102 and 112 can establish a communication connection, such as in a client-server networking model. Alternatively, the host device 122 and remote devices 102 and 112 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), the Internet, or an intranet. In certain embodiments, the remote devices 102 and 112 and the host device 122 may be local to each other, and communicate via any appropriate local communication medium. For example, the remote devices 102 and 112 and the host device 122 may communicate using a local area network (LAN), one or more hardwire connections, a wireless link or router, or an intranet. In some embodiments, the remote devices 102 and 112 and the host device 122 may be communicatively coupled using a combination of one or more networks and/or one or more local connections. For example, the first remote device 102 may be hardwired to the host device 122 (e.g., connected with an Ethernet cable) while the second remote device 112 may communicate with the host device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote device 102 may enable users to submit (or may submit automatically with or without user input) electronic documents (e.g., novels, journal articles, and other works of authorship) to the host devices 122. The electronic documents can be formatted in various ways including text, image, audio, and video. For example, the remote device 102 may include an electronic document submission module 110 and a user interface (UI). The electronic document submission module 110 may be in the form of a web browser or any other suitable software module, and the UI may be any type of interface (e.g., command line prompts, menu screens, graphical user interfaces). The UI may allow a user to interact with the remote device 102 to submit, using the document submission module 110, works of authorship (including novels and journal articles) to the host device 122.

In some embodiments, the remote device 112 may include a web crawler module 121 that enables a user to search (or may search automatically with or without user input) for Internet forums having particular displayed content (e.g., message threads, blog posts, user comments) and that further enables providing the displayed content to the host devices 122. In some embodiments, the web crawler module 121 can enable a user to search (or may search automatically with or without user input) for other electronic communications (e.g., text messages, instant messages, or emails that are isolated or are grouped together such that a group of related electronic communications between multiple parties are together considered one electronic communication). The remote device 112 may further include an information poster module 121 that enable a user to cause (or may cause automatically) information associated with a work of authorship (e.g., summaries, excerpts, paraphrases), which information is received from the host device 122, to be displayed (e.g., posted) on a particular Internet forum or other electronic communication.

In some embodiments, the host device 122 may include a natural language processing system 132. The natural language processing system 132 may include a natural language processor 134, a comparator module 136, and an information generator module 138. The natural language processor 134 may include numerous subcomponents, such as a tokenizer, a part-of-speech (POS) tagger, a semantic relationship identifier, and a syntactic relationship identifier. An example natural language processor is discussed in more detail in reference to FIG. 2. The natural language processor 134 may be configured to perform natural language processing to ingest a work of authorship (e.g., a work of authorship submitted by remote device 102) and/or to ingest content displayed on an Internet forum or other electronic communication (e.g., content submitted by remote device 112).

The comparator module 136 may be implemented using a conventional or other search engine, and may be distributed across multiple computer systems. The comparator module 136 may be configured to search one or more databases or other computer systems for content ingested by the natural language processor 134. For example, the comparator module 136 may be configured to compare ingested content displayed on an Internet forum or other electronic communication (and received from the web crawler module 120) in order to help identify displayed content that is relevant to ingested content of the work of authorship (received from the document submission module 110).

The information generator module 138 may be configured to analyze a work of authorship and to generate information associated with the work of authorship for posting (e.g., via the information poster module 121) to a previously selected Internet forum or other electronic communication. The information generator module 138 may include one or more modules or units, and may utilize the comparator module 136, to perform its functions (e.g., to determine a relationship between content of a work of authorship and content of an internet forum), as discussed in more detail in reference to FIG. 2.

While FIG. 1 illustrates a computing environment 100 with a single host device 122 and two remote devices 102 and 112, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet). The first host device may include a natural language processing system configured to receive and analyze content from an Internet forum or other electronic communication, and the second host device may include a natural language processing system configured to receive and analyze a work of authorship.

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
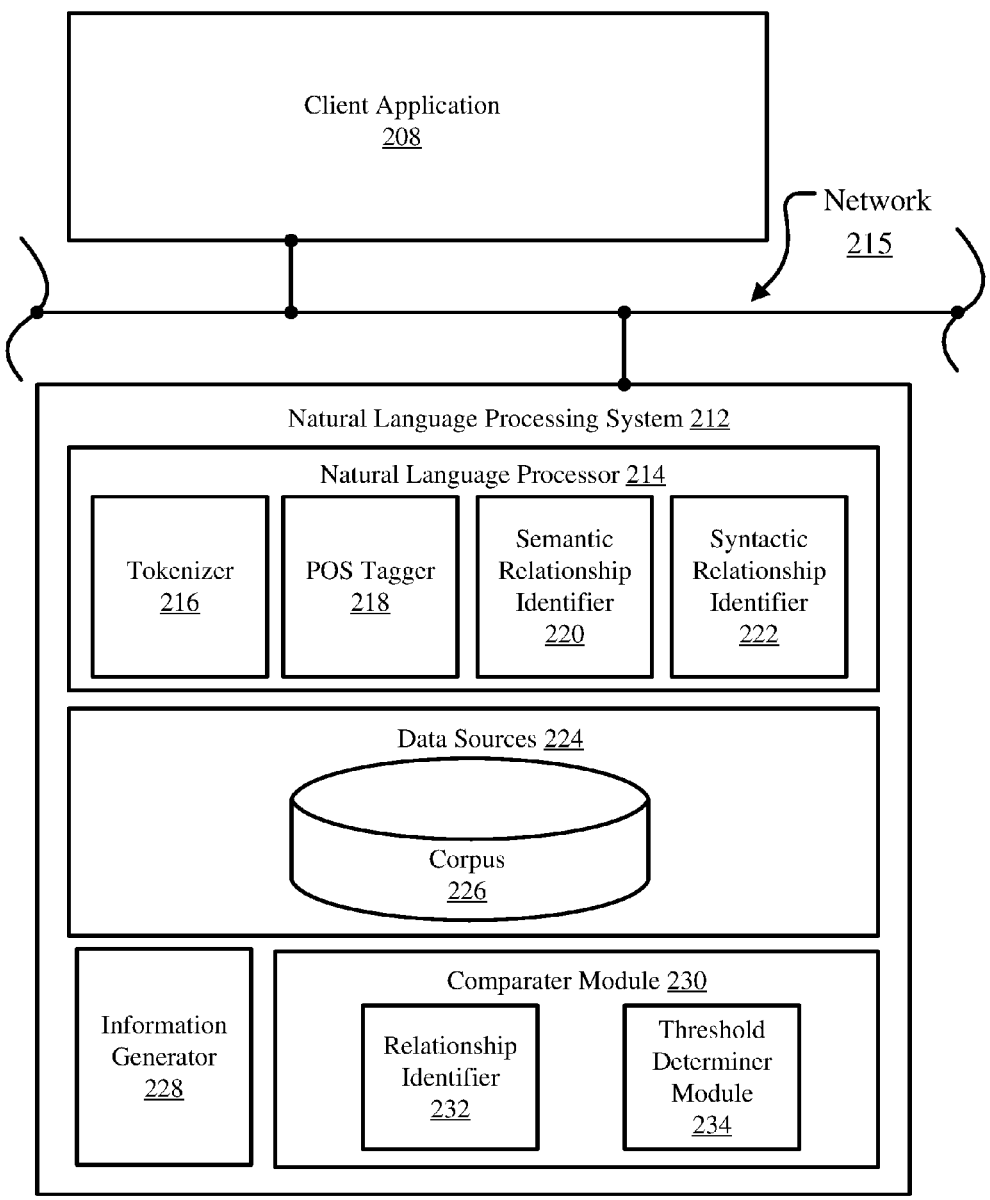
FIG. 2 illustrates a block diagram of an example natural language processing system configured to analyze an Internet forum to identify content and to generate related information based on a work of authorship, in accordance with embodiments of the present disclosure.

Referring now to FIG. 2, shown is a block diagram of an exemplary system architecture 200, including a natural language processing system 212, configured to analyze an Internet forum or other electronic communication to identify content and to generate related information based on a work of authorship, in accordance with embodiments of the present disclosure. In some embodiments, a remote device (such as remote device 102 of FIG. 1) may submit electronic documents (such as an electronic copy of a novel) to be analyzed to the natural language processing system 212 which may be housed on a host device (such as host device 122 of FIG. 1). In some embodiments, a second remote device (such as remote device 112 of FIG. 1) may submit other electronic content (such as content displayed on an Internet forum) to be analyzed to the natural language processing system 212. Such remote devices may each include a client application 208, which may itself involve one or more entities operable to generate or modify content from a work of authorship or an Internet forum or other electronic communication that is then dispatched to a natural language processing system 212 via a network 215.

Consistent with various embodiments, the natural language processing system 212 may respond to content submissions sent by a client application 208. Specifically, the natural language processing system 212 may analyze a received work of authorship, received Internet forum content or other received electronic communication content to identify characteristics about the received content (e.g., a theme, main idea, and characters). In some embodiments, the natural language processing system 212 may include a natural language processor 214, data sources 224, an information generator 228, and a comparator module 230. The natural language processor 214 may be a computer module that analyzes the received content. The natural language processor 214 may perform various methods and techniques for analyzing the received content (e.g., syntactic analysis, semantic analysis, etc.). The natural language processor 214 may be configured to recognize and analyze any number of natural languages. In some embodiments, the natural language processor 214 may parse passages of the received content. Further, the natural language processor 214 may include various modules to perform analyses of electronic documents. These modules may include, but are not limited to, a tokenizer 216, a part-of-speech (POS) tagger 218, a semantic relationship identifier 220, and a syntactic relationship identifier 222.

In some embodiments, the tokenizer 216 may be a computer module that performs lexical analysis. The tokenizer 216 may convert a sequence of characters into a sequence of tokens. A token may be a string of characters included in written passage and categorized as a meaningful symbol. Further, in some embodiments, the tokenizer 216 may identify word boundaries in content and break any text passages within the content into their component text elements, such as words, multiword tokens, numbers, and punctuation marks. In some embodiments, the tokenizer 216 may receive a string of characters, identify the lexemes in the string, and categorize them into tokens.

Consistent with various embodiments, the POS tagger 218 may be a computer module that marks up a word in passages to correspond to a particular part of speech. The POS tagger 218 may read a passage or other text in natural language and assign a part of speech to each word or other token. The POS tagger 218 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed content (e.g., the content of one novel may shed light on the meaning of text elements in related novel, or content of a first comment by a user on an Internet forum may shed light on meaning of text elements of a second comment by that user on the same or different Internet forum). Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, the POS tagger 218 may tag or otherwise annotate tokens of a passage with part of speech categories. In some embodiments, the POS tagger 218 may tag tokens or words of a passage to be parsed by the natural language processing system 212.

In some embodiments, the semantic relationship identifier 220 may be a computer module that may be configured to identify semantic relationships of recognized text elements (e.g., words, phrases) in received content. In some embodiments, the semantic relationship identifier 220 may determine functional dependencies between entities and other semantic relationships.

Consistent with various embodiments, the syntactic relationship identifier 222 may be a computer module that may be configured to identify syntactic relationships in a passage composed of tokens. The syntactic relationship identifier 222 may determine the grammatical structure of sentences such as, for example, which groups of words are associated as phrases and which word is the subject or object of a verb. The syntactic relationship identifier 222 may conform to formal grammar.

In some embodiments, the natural language processor 214 may be a computer module that may parse received content and generate corresponding data structures for one or more portions of the received content. For example, in response to receiving a medical journal at the natural language processing system 212, the natural language processor 214 may output parsed text elements from the medical journal as data structures. In some embodiments, a parsed text element may be represented in the form of a parse tree or other graph structure. To generate the parsed text element, the natural language processor 214 may trigger computer modules 216-222.

In some embodiments, the output of natural language processor 214 (e.g., ingested content) may be stored within data sources 224, such as corpus 226. As used herein, a corpus may refer to one or more data sources, such as the data sources 224 of FIG. 2. In some embodiments, the data sources 224 may include data warehouses, corpora, data models, and document repositories. In some embodiments, the corpus 226 may be a relational database.

In some embodiments, the comparator module 230 may be a computer module that compares ingested content of a work of authorship to ingested content displayed on Internet forum or other electronic communication. In some embodiments, the comparator module 230 may include a relationship identifier 232 and a threshold determiner module 234. The threshold determiner module 234 may identify a relationship between the ingested content of the work of authorship and the ingested content of a particular Internet forum or other electronic communication. This may be done by searching the ingested content of the work of authorship for semantic similarities and conceptual overlaps with ingested content of the Internet forum or other electronic communication. Certain similarities between the two sets of ingested contented may be weighted more heavily than others. For example, titles are often described by their relation to the main idea of the work of authorship, Internet forum, or other electronic communication, and therefore similar titles may indicate a relationship.

In some embodiments, the relationship identifier 232 first identifies a main idea within the ingested content of the work of authorship, and then the relationship identifier 232 may search the ingested content of the Internet forum or other electronic communication for substantially similar content. Such similar content may include words or phrases indicating date, characters, or words that are related to content within the work of authorship. In some embodiments, in order to identify Internet forum content or other electronic communication content associated with one or more main ideas of the work of authorship, the relationship identifier 232 may search the corpus 226 for related concepts.

In some embodiments, after relationship identifier 232 identifies a relationship between the ingested content of the work of authorship and the ingested content of the Internet forum or other electronic communication, the threshold determiner module 234 may be configured to determine if the relationship satisfies a relationship threshold. The relationship may be evaluated based on a set of relatedness criteria in order to determine whether or not the relationship satisfies the threshold. In some embodiments, this can help to ensure that information associated with the work of authorship is only published to Internet forums or other electronic communications (and specific portions within Internet forums or other electronic communications) that have previously displayed content that is sufficiently similar to the content of the work of authorship. This may help to avoid, for example, the problems that would follow if the system 200 inundated Internet forums with information that is irrelevant to the content previously posted on the Internet forums. In other words, the threshold can be implemented so that the system 200 targets Internet forums that include threads or comments that have strong relationships with the work of authorship.

In some embodiments, after a relationship identified by the relationship identifier 232 satisfies the standards of the threshold determiner module 234, the information generator 228 may generate information about the work of authorship that can be posted on the related Internet forum or other related electronic communication (e.g., by the information poster module 121 of FIG. 1). In some embodiments, the information may be predetermined. In other embodiments, the information may be generated based on the nature of the relationship between the work of authorship and the Internet forum or other electronic communication. For example, if the content of an Internet forum is only associated with a single chapter of a work of authorship, then the information generator 228 may generate a summary of that single chapter for posting to the Internet forum.

Figure 3:
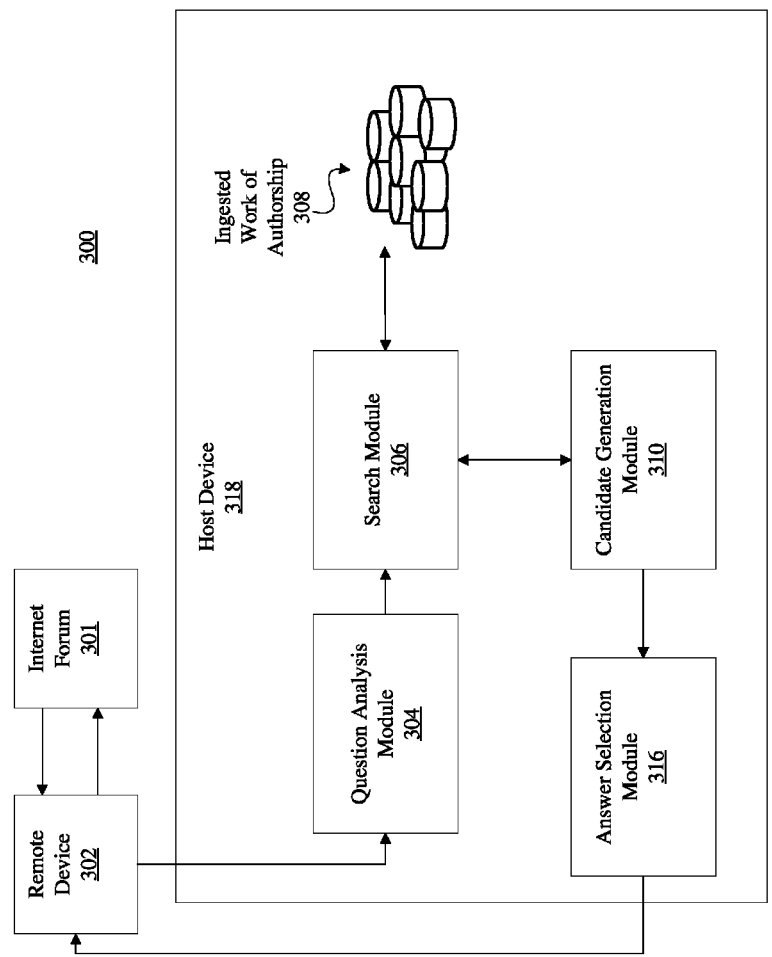
FIG. 3 illustrates a block diagram of an example high-level logical architecture of a Question Answering (QA) system configured for using an ingested work of authorship to generate answers to questions displayed on Internet forums, in accordance with embodiments of the present disclosure.

FIG. 3 illustrates a system diagram of an example high level logical architecture of a Question Answering (QA) system 300 configured for using an ingested work of authorship to generate answers to questions displayed on Internet forums, in accordance with embodiments of the present disclosure. In some embodiments, host device 318 and remote device 302 of the QA system 300 may be embodied by host device 122 and remote device 112 of FIG. 1, respectively. In some embodiments, the question analysis module 304, located on host device 318, may receive a natural language question from a remote device 302, and can analyze the question to produce an ingested form of the question based on its content and context type. In embodiments, the question can be retrieved, by the remote device 302, from an Internet forum 301. The retrieved question can be that of a question included in a comment within the Internet forum 301. The question may be an express or implicit question. An analysis produced by question analysis module 304 may include, for example, the semantic type of the expected answer.

In some embodiments, the search module 306 may formulate queries from the output of the question analysis module 304 and may consult various resources e.g., databases or corpora, to retrieve content that is relevant to answering the user question. In embodiments, the databases or corpora includes only a single ingested work of authorship 308. The ingested work of authorship can be an article or novel that an author or publisher would like to market throughout the Internet by targeting Internet forums that include relevant content. In some embodiments, multiple ingested works of authorship may be included in the relevant corpora.

As shown in FIG. 3, the search module 306 may consult ingested work of authorship 308. The candidate answer generation module 310 may then extract from the search results potential (candidate) answers to the question obtained from the Internet forum 301, which candidate answers may then be scored and ranked by the answer selection module 316. A final answer, based on a comparison of various confidence scores and sub scores associated with the candidate answers, may then be sent from the answer selection module 316 to remote device 302 for posting on the Internet forum 301. For example, the answer may be posted on the Internet forum below the comment that included the question.

In some embodiments, a summary that includes reasoning about why the answer was chosen may be posted along with the answer on the Internet forum. In some embodiments, the posted summary may also include evidence for why the answer was chosen. For example, the summary may describe the relationship between the question and the answer. For another example, the summary may also include direct quotations (e.g., one or more excerpts) from the work of authorship that clearly show the link between the question and the answer.

In some embodiments, variants of the system 300 may be configured for using an ingested work of authorship to generate answers to questions displayed on electronic communications other than Internet forums. For example, a variant of the system 300 could be used to identify a question in a text messaging session between two friends and then use an ingested work of authorship to generate an answer to the question that is then displayed as part of the text messaging session (e.g., as a new text message within the session or as a comment on a sidebar).

Figure 4:
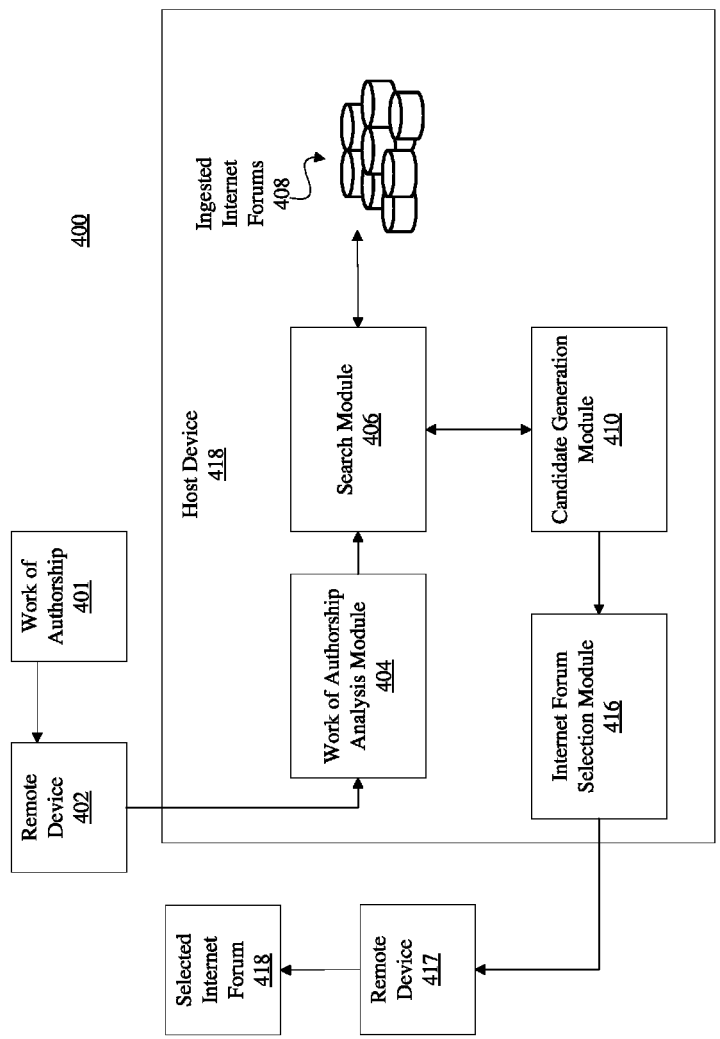
FIG. 4 illustrates a block diagram of an example high-level logical architecture of a Forum Selection system for identifying appropriate Internet forums on which to cause information associated with a work of authorship to be displayed, in accordance with embodiments of the present disclosure.

FIG. 4 illustrates a system diagram of an example high level logical architecture of a Forum Selection system 400 for identifying appropriate Internet forums on which to cause information associated with a work of authorship to be displayed, in accordance with embodiments of the present disclosure. In some embodiments, host device 418, remote device 402, and remote device 417 may be embodied by host device 122, remote device 102, and remote device 112 of FIG. 1, respectively. In some embodiments, the work of authorship analysis module 404, located on host device 418, may receive a work of authorship 401 in the form of an electronic file from a remote device 402 and may analyze the work of authorship 401 to produce ingested content of the work of authorship based on its content and context type. The analysis produced by work of authorship analysis module 404 may include, for example, the semantic type of the main idea of the work of authorship 401. The search module 406 may formulate queries from the output of the work of authorship analysis module 404 and may consult various resources such as the Internet or one or more knowledge resources, e.g., databases or corpora, to identify candidate Internet forums that include relevant content to that of the work of authorship 401.

As shown in FIG. 4, the search module 406 may consult ingested internet forums 408. The ingested internet forums may include content displayed on various Internet forums that were previously ingested by the host device 418. The candidate generation module 410 may then extract from the search results potential (candidate) Internet forums to which information associated with the work of authorship 401 may be posted. These potential Internet forums may then be scored by the internet forum selection module 416. Each score can indicate the strength of a relationship between the content of the Internet forum and the content of the work of authorship. A final candidate Internet forum, based on a comparison of various relationship scores associated with the candidate Internet forums, may then be selected by the Internet forum selection module 416. Information associated with the authorship 401 may then be sent from the Internet forum selection module 416 to remote device 417 for posting on the selected Internet forum 418.

In some embodiments, variants of the system 400 may be used for identifying appropriate electronic communications on which to cause information associated with a work of authorship to be displayed. For example, a variant of the system 400 could be used to search email messages in an individual's inbox to select an appropriate email into which information about particular work of authorship should be added (e.g., in a sidebar when that email is opened).

Figure 5:
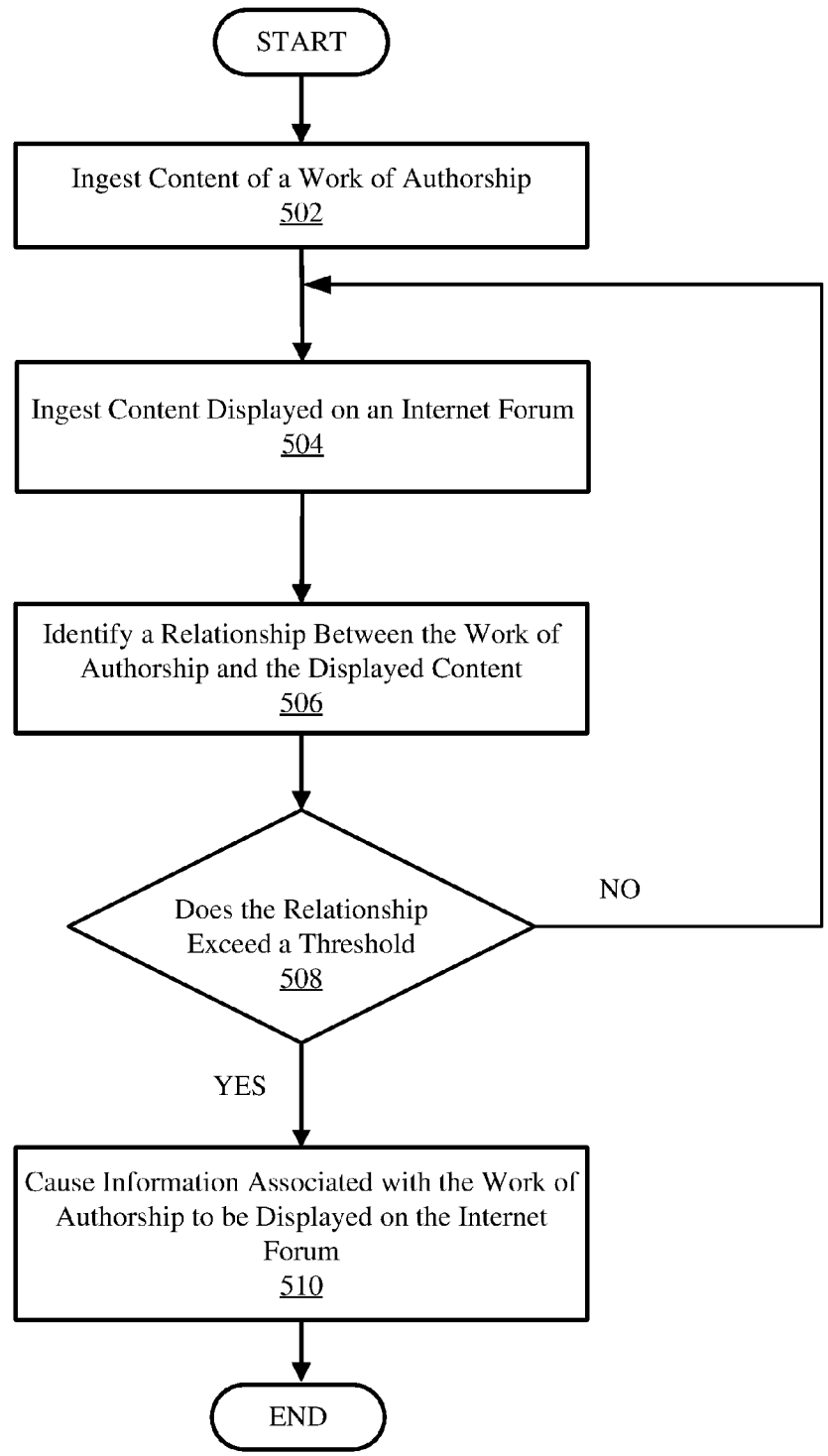
FIG. 5 illustrates an example flowchart of a method for determining whether information associated with a work of authorship should be displayed on a particular Internet forum, in accordance with embodiments of the present disclosure.

FIG. 5 illustrates a flowchart of a method 500 for determining whether information associated with a work of authorship should be displayed on an particular Internet forum, consistent with various embodiments of the present disclosure. In some embodiments the operations of method 500 may be performed by host device 122 of FIG. 1. In some embodiments, variants of the method 500 may be performed on electronic communications other than Internet forums. In embodiments, operation 502 can include ingesting content of a work of authorship. The ingesting can include analyzing and parsing the work of authorship into its basic syntactic and semantic components. In embodiments, the work of authorship can be a printed publication, e.g., a magazine article or novel, or an electronic document. The work of authorship can be in one or more languages. For example, the work of authorship may not be limited to English. In some cases, the work of authorship can in a format including text, images, audio, video, and some combination thereof. For example, the work of authorship can be an audio book or a movie. In embodiments, once the operation 502 has ingested the work of authorship, the method can proceed to an operation 504.

In embodiments, operation 504 can include ingesting content displayed on an Internet forum. The ingesting can include analyzing and parsing the displayed content into its basic syntactic and semantic components. In some embodiments, portions of the displayed content may be sorted based on where the content is located within the Internet forum or sorted according to which users posted the portions. This organizing the comments according to user can be useful for further determining context for a particular portion of the displayed content. In embodiments, once the operation 504 has ingested the internet forum, the method can proceed to an operation 506.

In embodiments, operation 506 can identify a relationship between the ingested content of the work of authorship and the ingested content displayed on the Internet forum. In embodiments, the relationship can be that the content of the work of authorship and the content of the Internet forum are substantially similar. For example, the work of authorship and the Internet forum can include substantially similar titles or themes. In embodiments, the relationship can also be that the work of authorship and the Internet forum can be related to a similar subject, e.g., the Internet forum could be a Game of Thrones Internet forum and the work of authorship can be the novel Game of Thrones. In embodiments, once the relationship has been identified by operation 506, the method 500 can proceed to a decision block 508.

In embodiments, decision block 508 can include determining whether the relationship exceeds a threshold of relevance. In embodiments, when the relationship does not exceed the threshold, the method 500 can proceed back to operation 504 in order to ingest another Internet forum that may, hopefully, have content that is more relevant to the work of authorship. In embodiments, when the relationship exceeds the threshold, the decision block 508 can proceed to an operation 510.

In embodiments, operation 510 can include causing information associated with the work of authorship to be displayed on the Internet forum such that the information is visually-associated with the displayed content. In some cases, the associated information can be in the form of an excerpt from the work of authorship. In some cases, the associated information with the work of authorship can be in the form of an audio or video clip, an image, or some combination thereof. The associated information can be posted in a substantially similar format as the format in which other portions of content within the Internet forum are posted. In some cases, the associated information can be intelligently created based on a history of a user that posted the content that created the relationship between the internet Forum and the work of authorship. In some cases, the history of the user can be a history of comments associated with the user. For example, the history could be comments by the user or sub comments left by the user in response to other user's comments. In embodiments, once the displaying has occurred by the operation 510, the method 500 can conclude.

Figure 6:
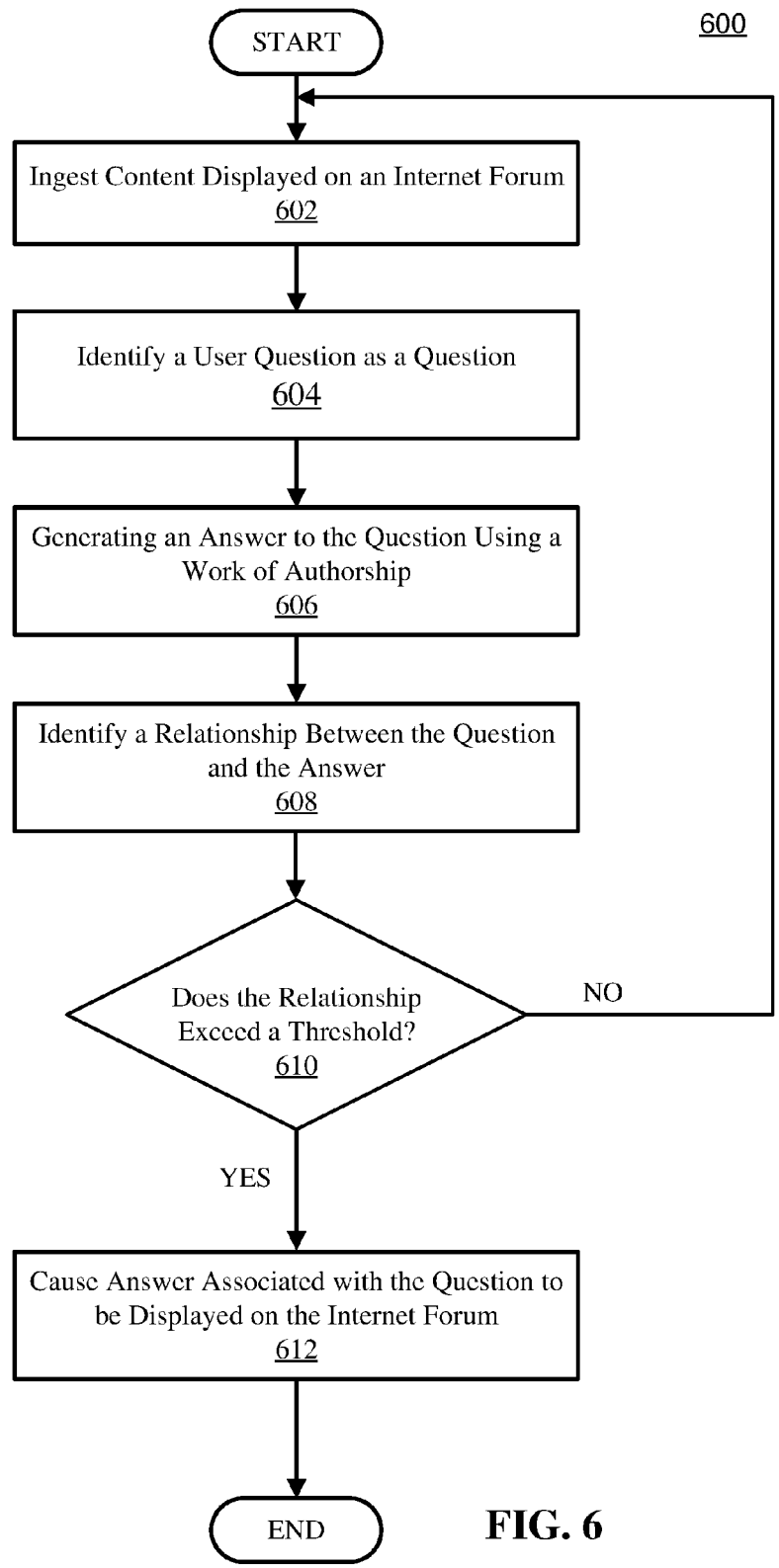
FIG. 6 illustrates an example flowchart of a method of using a QA system for answering questions displayed on an Internet forum using ingested content of a work of authorship, in accordance with embodiments of the present disclosure.

FIG. 6 illustrates a flowchart of a method 600 of using a QA system for answering questions displayed on an Internet forum using ingested content of a work of authorship, in accordance with embodiments of the present disclosure. In some embodiments, operations of method 600 may be performed by host device 122 and/or remote device 112 of FIG. 1. In some embodiments, variants of the method 600 may be performed on electronic communications other than Internet forums. In embodiments, operation 602 can include ingesting content displayed on an Internet forum. In embodiments, the Internet forum could include one or more comments posted by one or more users. In some cases, the one or more comments can be in the form of a question, e.g., "How tall is a giraffe?" For another example, the Internet forum could be a Game of Thrones Internet forum and the comment could be a question asking what will happen on a following week's episode. Further, it is contemplated that, in some embodiments, questions may not always be received from human users and instead may be generated by computer systems or components of computer systems.

In some cases, the ingesting of the content of the Internet forum can include performing natural language processing on the content (e.g., by using natural language processing system 212 of FIG. 2). The content of the Internet forum (e.g., threads or comments) may contain genres, facts, plots, and timelines about various subject matter. In embodiments, once operation 602 has ingested the internet forum, the method 600 can proceed to an operation 604.

In embodiments, operation 604 includes identifying a user question as a question. In some cases, a question, within a comment, asked on Internet forum could be identified as a question based on the context (e.g., being followed by a question mark). One or more components (e.g., components 216-222) that may be able to analyze one or more aspects of the question. In embodiments, once the operation 604 has identified the user question as a question, the method 600 can proceed to an operation 606.

In embodiments, operation 606 can include generating an answer to the question using a work of authorship. In some embodiments, the work of authorship may be preselected for use in answering the question. In some embodiments, the answer may be generated by comparing the ingested Internet forum content to ingested content from the work of authorship. In some cases, a first set of (i.e., one or more) answers may be generated in response to the question. Furthermore, in some embodiments, some potential answers may be identified or generated, but later rejected or modified without becoming a final answer to be posted. In embodiments, once operation 606 has generated an answer to the question, the method can proceed to an operation 608.

In embodiments, operation 608 can include identifying a relationship between the question and the answer. In some embodiments, the relationship may indicate a level of confidence in a given answer based on a number of factors. These factors may include, for example, the content of the question, the content of the answer, the similarity of the context of the work of authorship with the context of the applicable user question, etc. It is contemplated that factors may be weighted differently and that not all factors may be applicable to every answer. In some embodiments, a relationship rule may be used to determine a relationship score that indicates the strength of the relationship. As used herein, a relationship rule may refer to a rule (e.g., an algorithm, a set of algorithms, or a set of other procedures) that may rely on inputting values for variables, in order to output a relationship score that may be indicative of, among potentially other things, the value of the work of authorship in the context of supporting the answer to the question from the Internet forum. In embodiments, once operation 608 has identified a relationship, the method can proceed to decision block 610.

Next, per decision block 610, a determination may be made as to whether the relationship between the question and the answer exceeds a threshold. As used herein, a threshold may be indicative of a minimal acceptable level of confidence in a particular answer. Different threshold scores may be used under different circumstances. If the relationship is above the threshold, then, per decision block 610, the answer (e.g., or an answer with a highest relationship score if multiple answers are being evaluated together) may be displayed within the Internet forum as visually associated with the question, per operation 612. If, however, the relationship is below the threshold, then, per block 610, the QA system may ingest content displayed on another Internet forum, per operation 602.

In embodiments, operation 612 includes causing the answer associated with the question that exceeded the threshold to be displayed on the Internet forum. In some cases, more than one generated answer can be displayed on the Internet forum. In some cases, a link that can redirect a user to a webpage can also be posted on the Internet forum. The webpage can contain a list of answers associated with the question or may be website where a user can purchase the work of authorship that was used to answer the question. In embodiments, once operation 612 has caused the answer to be displayed on the Internet forum, the method 600 can conclude.

Figure 7:
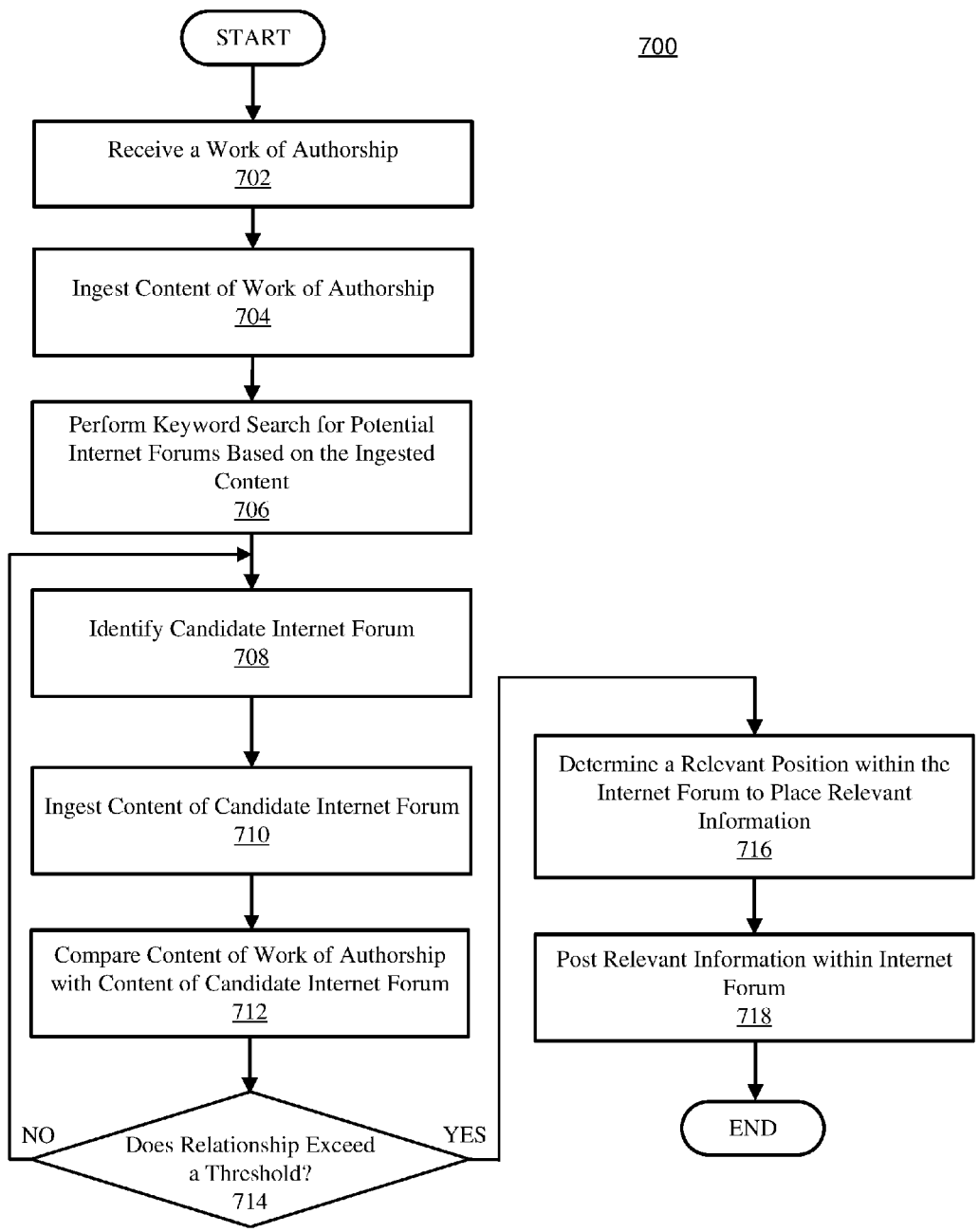
FIG. 7 illustrates an example flowchart of a method for using a pre-search based on ingested content of a work of authorship as part of identifying an appropriate Internet forum for posting information associated with the work of authorship, in accordance with embodiments of the present disclosure.

FIG. 7 illustrates a flowchart of a method 700 for using a pre-search based on ingested content of a work of authorship as part of identifying an appropriate Internet forum for posting information associated with the work of authorship, in accordance with embodiments of the present disclosure. In some embodiments, one or more operations of the method 700 may be performed by natural language processing system 212 of FIG. 2. In some embodiments, variants of the method 700 may be performed on electronic communications other than Internet forums. The method 700 may begin at operation 702 with receipt of a work of authorship (e.g., a novel, magazine, or journal article) that is submitted by a user or automatically identified and submitted by a computer module. Per operation 704, natural language processing may be performed on the work of authorship in order to ingest content of the work of authorship. The natural language processing may incorporate any relevant natural language processing techniques including, without limitation, those techniques discussed in reference to modules 216-222 of FIG. 2.

When ingesting content (as described in operation 704 and elsewhere herein), the results of the natural language processing of that content may be utilized. For example, as part of natural language processing of a text passage, the passage may be parsed, and entity resolution techniques may be helpful in identifying important entities with the passage. Once entities have been identified, correlations and linguistic links between entities may be detected and used to establish relevance of the entities and, ultimately, the context of the passage. An example technique that may be useful in determining the relative importance of a given entity to the context of the passage is inverse document frequency, which utilizes the relative commonality of the entity as an indicator of its importance to evaluating context. Many other techniques may also be used. These same techniques may useful for determining a main idea of a portion of content or keywords of a portion of content.

Per operation 706, a search (e.g., pre-search) may be undertaken for potential Internet forums based on the ingested content of the work of authorship. In some embodiments, the search may be a preliminary search intended to obtain several candidate Internet forums (or several portions of text within one Internet forum) that can then be limited further to a smaller group of Internet forums (or portions thereof) by more individualized analysis. The search may incorporate static keyword searching of the Internet using keywords (e.g., relatively important entities) obtained from the work of authorship. Furthermore, in some embodiments, the search may utilize one or more third-party search engines. In embodiments, once operation 706 has performed the search, the method 700 can proceed to operation 708.

In embodiments, operation 708 can include identifying a candidate Internet forum. This identifying can include selecting an Internet forum that resulted from the search performed by operation 706. In embodiments, the identified Internet forum (or, potentially, multiple identified Internet forums) could have related links, titles, and keywords compared the keywords used in the search. In some cases, the identified Internet forum could include content that has topics similar to the topics of the work of authorship. In embodiments, once operation 708 has identified a candidate Internet forum, the method 700 can proceed to an operation 710.

In embodiments, operation 710 can include ingesting content of the identified candidate Internet forum. The natural language processing may incorporate any relevant natural processing techniques including, without limitation, those techniques discussed in reference to modules 216-222 of FIG. 2. In embodiments, this ingesting can be substantially similar to the ingesting performed in operation 702. This ingesting can include performing an analysis of the searched Internet forum. In embodiments, once operation 710 has ingested content of the identified candidate Internet forum, the method 700 can proceed to an operation 712.

Continuing to operation 712, and based on the results of the natural language processing of the identified candidate Internet forum in operation 710, the ingested content of the work of authorship may be compared with the ingested content of the identified candidate Internet forum. A determination is made, per decision block 714, as to whether a relationship between the portions of ingested content exceeds a threshold (e.g., indicates substantial similarity). If a determination is made in decision block 714 that the relationship is not strong enough (e.g., the threshold is not achieved), then the identified candidate Internet forum may be discarded and the method 700 may continue to operation 708 wherein a second candidate Internet forum is identified.

If, however, it is determined in decision block 714 that the relationship exceeds the threshold, then, per decision block 714, the method 700 can proceed to an operation 716.

In embodiments, operation 716 can include determining a relevant position within the Internet forum to place relevant information associated with the work of authorship. In some cases, the relevant position can be adjacent to a comment within the Internet forum that is closely related to the information. For example, the comment could contain a question or content that was most related to the content of the work of authorship. Per operation 718, a display of the relevant information may be added (e.g. posted) within the Internet forum. The display can be in a format that is substantially similar to the format of the comment within the Internet forum. In some cases, the displayed relevant information can be an excerpt or a short summary of the work of authorship. In some cases, the excerpt or the short summary can be intelligently created based upon a history of a user's comments within the Internet forum. In embodiments, once operation 716 has posted the relevant information to the Internet forum, the method 700 can conclude.

Referring now to FIG. 8, shown is an example diagram illustrating use of methods disclosed herein to ingest example content displayed on an Internet forum, in accordance with embodiments of the present disclosure. Specifically, the diagram includes a screenshot 800 of an example Internet forum 810 and an associated action completion sidebar 820. As shown, the example Internet forum 810 is a "People's Favorite Books Internet Forum." In this example, the action completion sidebar 820 may include a continuously or periodically updated collection of concepts 840 derived from performing natural language processing on the posts on the Internet forum 810. In embodiments, the ingested content 840 can be continuously updated by a natural language processor 860. In embodiments, the action completion sidebar 820 may be a GUI tool used to aid a user in determining whether or not to post content (e.g., information) suggested based on a work of authorship. In some embodiments, a computer system (not shown) may use the ingested content 840 to search through ingested content of a work of authorship in order to identify a relationship between the content of the Internet forum 810 and the work of authorship, and then generate, based on the work of authorship, information to be posted on the Internet forum 810.

Also included in screenshot 800 is a location recommender line 850. In some embodiments, this location recommender line 850 may serve to point out a relevant position located within the Internet forum 810 to place information associated with the work of authorship. For example, in the depicted instance, the location recommender line 850 points to the passage entitled "A User's Comment". This may serve to indicate that information associated with the work of authorship should be placed near (e.g., below) this particular comment. Further, in some embodiments, one or more of the natural language processing techniques discussed herein may be used in making this location recommendation. In the depicted screenshot 800, the action completion sidebar 820 includes a visual display of the ingested content 840. Also shown are guide lines 830 and boxes that indicate the words or phrases that caused the system to determine that this was a good location to place information associated with the work of authorship.

Referring now to FIG. 9, shown is a diagram of an example the results of using methods disclosed herein to generate and post information associated with a work of authorship to the Internet forum 810 described in FIG. 8, in accordance with embodiments of the present disclosure. Specifically, shown is a screenshot 900 of the Internet forum 810, wherein information associated with the work of authorship 920 has been posted to the Internet forum 810. The screenshot 900 may show the Internet forum 810 in the manner that it is typically seen by the general public (e.g., without the action completion sidebar 820 of FIG. 8). In this example, the User's Comment within the internet forum 810 is directed to his analysis of a book. The User's Comment also includes a question asking if there is a substantially similar book that includes topical humor relevant to international issues.

In this example, the information associated with the work of authorship 920 includes excerpts from a second book that is directed to the subject matter that was requested in the comment. Furthermore, in this example, the information 920 is displayed as a sub-comment that responds to the user's comment.

Figure 10:
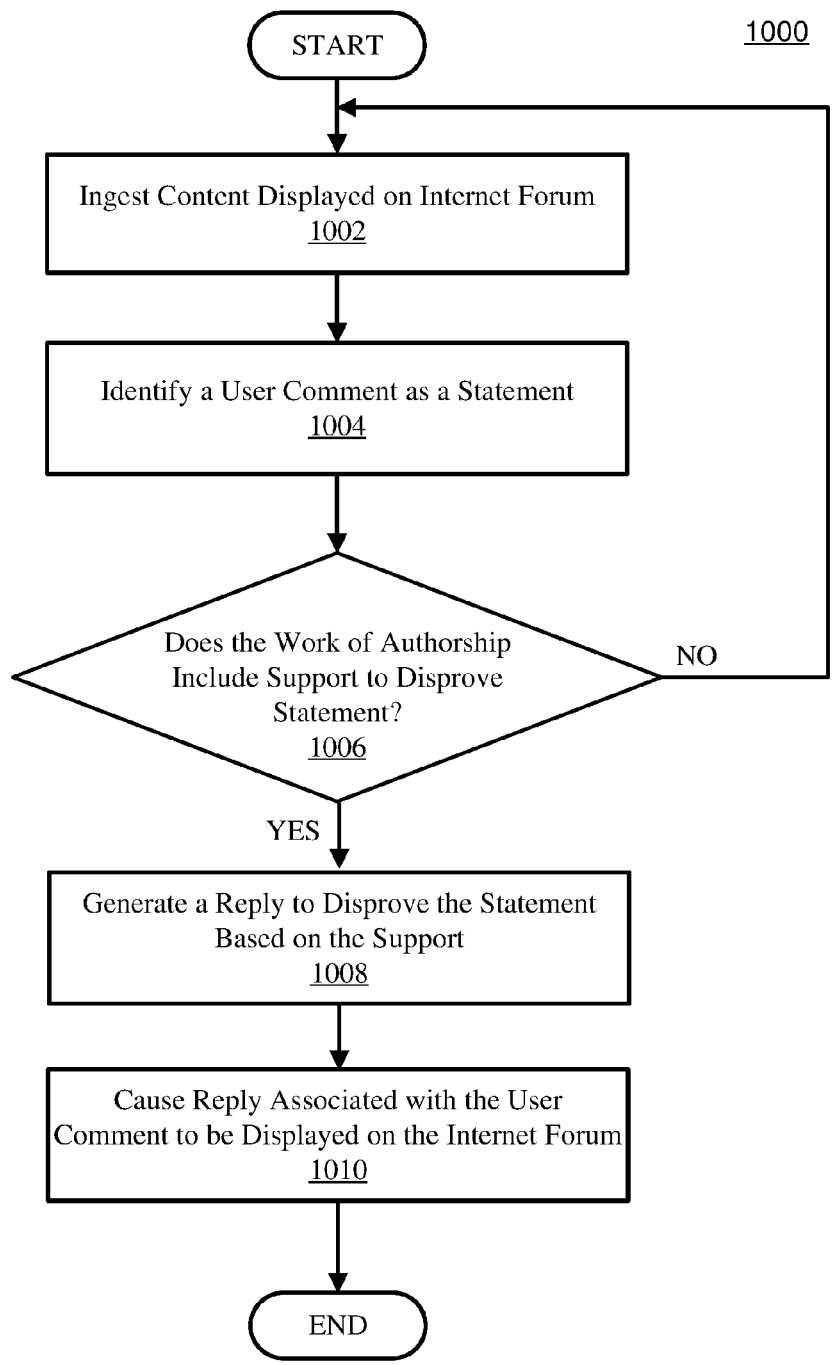
FIG. 10 illustrates an example flowchart of a method of using a QA type system for disproving false statements with replies that are supported by content of a work of authorship, in accordance with embodiments of the present disclosure.

FIG. 10 illustrates a flowchart of a method 1000 of using a QA type system for replying to incorrect user posts displayed on an Internet forum using ingested content of a work of authorship, in accordance with embodiments of the present disclosure. In some embodiments, the QA type system can be substantially similar to the QA system described in FIG. 6, but can identify a false statement and generate a reply to the false statement, rather than identifying a question and generating an answer. In some embodiments, operations of method 1000 may be performed by host device 122 and/or remote device 112 of FIG. 1. In some embodiments, variants of the method 1000 may be performed on electronic communications other than Internet forums. In embodiments, operation 1002 can include ingesting content displayed on an Internet forum. In embodiments, the Internet forum could include one or more comments posted by one or more users. In some cases, the one or more comments can be in the form of false statements, e.g., "A giraffe is one-hundred feet tall." For another example, the Internet forum could be a Game of Thrones Internet forum and the comment could be a false statement about an ending for the current week's episode. Further, it is contemplated that, in some embodiments, false statements may not always be received from human users and instead may be generated by computer systems or components of computer systems.

In some embodiments, the ingesting of the content of the Internet forum can include performing natural language processing on the content (e.g., by using natural language processing system 212 of FIG. 2). The content of the Internet forum (e.g., threads or comments) may contain genres, facts, plots, and timelines about various subject matter. In embodiments, once operation 1002 has ingested the Internet forum, the method 1000 can proceed to an operation 1004.

In embodiments, operation 1004 includes identifying a user comment as a false statement. In some cases, a false statement, within a comment, asked on Internet forum could be identified as a false statement based on the context. One or more components (e.g., components 216-222 of FIG. 2) may be able to analyze one or more aspects of the false statement. In some cases, a user reply to a false statement could be identified and used to support the conclusion that the statement is false. In embodiments, once the operation 1004 has identified the user comment as a false statement, the method 1000 can proceed to an operation 1006.

Next, per decision block 1006, a determination may be made as to whether content of the work of authorship includes support to disprove the false statement. In some cases, the determination may be based on determining which content of the work of authorship is relevant to the false statement. This relevant content can include similar terminology as the user comment but can include a different conclusion. The content of the work of authorship can be tested for accuracy. Whether a portion of content can be used to support disproving the user comment may depend on whether that content satisfies a threshold of accuracy. As used herein, an accuracy threshold may be indicative of a minimal acceptable level of confidence in a particular piece of evidence for disproving the false statement. Different threshold scores may be used under different circumstances. If content within the work of authorship is above the threshold, then, per decision block 1006, the method 1000 may proceed to operation 1008. If, however, the content is below the threshold, then, per block 1006, the QA type system may ingest content displayed on another Internet forum, per operation 1002.

In embodiments, operation 1008 can include generating a reply to the false statement based on the work of authorship. In some embodiments, the work of authorship may be preselected for use in replying to the false statements. In some embodiments, the reply may be generated by comparing the ingested Internet forum content to ingested content from the work of authorship. In some cases, a first set of (i.e., one or more) replies may be generated in response to the false statement. Furthermore, in some embodiments, some potential replies may be identified or generated, but later rejected or modified without becoming a final reply to be posted. In some cases, facts supporting the reply can be generated in order to validate the reply. In embodiments, once operation 1008 has generated a reply to the false statement, the method can proceed to an operation 1010.

In embodiments, operation 1010 includes causing the reply associated with disproving the false statement to be displayed on the Internet forum. In some cases, more than one generated reply can be displayed on the Internet forum. In embodiments, once operation 1010 has caused the reply to be displayed on the Internet forum, the method 1000 can conclude.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the foregoing detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the foregoing description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method comprising:
   ingesting, using natural language processing (NLP), content of a work of authorship;
   ingesting, using NLP, content displayed on an Internet forum;
   identifying, based on the ingested content of the work of authorship and the ingested content displayed on the Internet forum, a relationship between the work of authorship and the displayed content;
   causing, based on the identified relationship, information associated with the work of authorship to be displayed on the Internet forum such that the information is visually-associated with the displayed content, wherein the displayed content includes a user question posted to the Internet forum by a user, wherein the information includes an answer to the user question, and wherein the identifying the relationship comprises:
   identifying the user question as a question; and
   generating, in response to the identifying the user question as a question and based on a search of the ingested content of the work of authorship, the answer to the user question.

2. The method of claim 1, wherein the information is an excerpt from the work of authorship.

3. The method of claim 1, wherein the causing the information to be displayed is further based on a user history, the method further comprising:
   identifying the user history for a user that posted the displayed content to the Internet forum;
   ingesting, using NLP, content of the user history.

4. The method of claim 1, wherein the displayed content is a thread of messages and wherein an excerpt is added as a message in the thread.

5. The method of claim 1, wherein the relationship is a relatedness over a threshold.

6. The method of claim 1, wherein the content displayed on the Internet forum is identified by a pre-search, the pre-search comprising:
   identifying, using NLP, keywords within the work of authorship; and
   searching, based on the identified key words, the Internet for Internet forums that are related to the keywords.

7. The method of claim 1, wherein the displaying the visually-associated information further comprises:
   adding the visually-associated information adjacent to a relevant portion of the displayed content.

8. A system comprising:
   a processor; and
   a computer readable storage medium having program instructions embodied therewith, the program instructions executable by the processor to cause the system to:
   ingest, using natural language processing (NLP), content of a work of authorship;
   ingest, using NLP, content displayed on an Internet forum;
   identify, based on the ingested content of the work of authorship and the ingested content displayed on the Internet forum, a relationship between the work of authorship and the displayed content;
   cause, based on the identified relationship, information associated with the work of authorship to be displayed on the Internet forum such that the information is visually-associated with the displayed content, wherein the displayed content includes a user question posted to the Internet forum by a user, wherein the information includes an answer to the user question, and wherein the identifying the relationship comprises:
   identifying the user question as a question; and
   generating, in response to the identifying the user question as a question and based on a search of the ingested content of the work of authorship, the answer to the user question.

9. The system of claim 8, wherein the information is an excerpt from the work of authorship.

10. The system of claim 8, wherein the causing the information to be displayed is further based on a user history, the program instructions are further executable by the processor to cause the system to:
    identify the user history for a user that posted the displayed content to the Internet forum;
    ingest, using NLP, content of the user history.

11. The system of claim 8, wherein the displayed content is a thread of messages and wherein an excerpt is added as a message in the thread.

12. The system of claim 8, wherein the relationship is a relatedness over a threshold.

13. The system of claim 8, wherein the content displayed on the Internet forum is identified by a pre-search, the pre-search comprising:
    identifying, using NLP, keywords within the work of authorship; and
    searching, based on the identified key words, the Internet for Internet forums that are related to the keywords.

14. The system of claim 8, wherein the displaying the visually-associated information further comprises:
    adding the visually-associated information adjacent to a relevant portion of the displayed content.

15. A computer program product for displaying visually-associated information on an internet forum, the computer program product comprising a computer readable storage medium having program instructions embodied therewith, wherein the computer readable storage medium is not a transitory signal per se, the program instructions executable by a computer to perform a method comprising:
    ingesting, using natural language processing (NLP), content of a work of authorship;
    ingesting, using NLP, content displayed on an Internet forum;

identifying, based on the ingested content of the work of authorship and the ingested content displayed on the Internet forum, a relationship between the work of authorship and the displayed content;

causing, based on the identified relationship, information associated with the work of authorship to be displayed on the Internet forum such that the information is visually-associated with the displayed content, wherein the displayed content includes a user question posted to the Internet forum by a user, wherein the information includes an answer to the user question, and wherein the identifying the relationship comprises:

identifying the user question as a question; and generating, in response to the identifying the user question as a question and based on a search of the ingested content of the work of authorship, the answer to the user question.

16. The computer program product of claim 15, wherein the information is an excerpt from the work of authorship.

17. The computer program product of claim 15, wherein the causing the information to be displayed is further based on a user history, the method further comprising:

identifying the user history for a user that posted the displayed content to the Internet forum;

ingesting, using NLP, content of the user history.

18. The computer program product of claim 15, wherein the content displayed on the Internet forum is identified by a pre-search, the pre-search comprising:

identifying, using NLP, keywords within the work of authorship; and searching, based on the identified key words, the Internet for Internet forums that are related to the keywords.

19. A method comprising:

ingesting, using natural language processing (NLP), content of a work of authorship;

ingesting, using NLP, content displayed within an electronic communication;

identifying, based on the ingested content of the work of authorship and the ingested content displayed within the electronic communication, a relationship between the work of authorship and the displayed content;

causing, based on the identified relationship, information associated with the work of authorship to be displayed within the electronic communication such that the information is visually-associated with the displayed content, wherein the displayed content includes a false statement posted within the electronic communication as a user comment, wherein the information includes a reply to the user that disproves the false statement, and wherein the identifying the relationship comprises:

identifying the user comment as a false statement; and generating, in response to the identifying the user comment as a false statement and based on a search of the ingested content of the work of authorship, the reply to the user that disproves the false statement.

20. The method of claim 19, wherein the information includes an excerpt from the work of authorship and a summary of why the excerpt was chosen from the work of authorship.

21. The method of claim 19, wherein the causing the information to be displayed is further based on a user history, the method further comprising:

identifying the user history for a user that posted the displayed content within the electronic communication;

ingesting, using NLP, content of the user history.

* * * * *